Oct. 11, 1927.
H. N. COX
1,645,417
COLOR PHOTOGRAPHY
Original Filed May 24, 1921  2 Sheets-Sheet 1
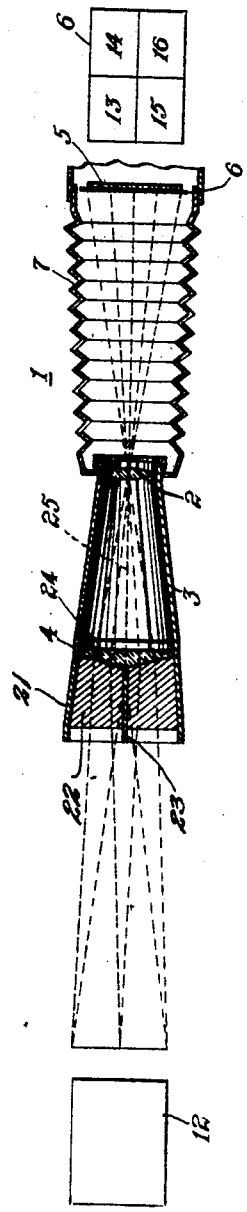
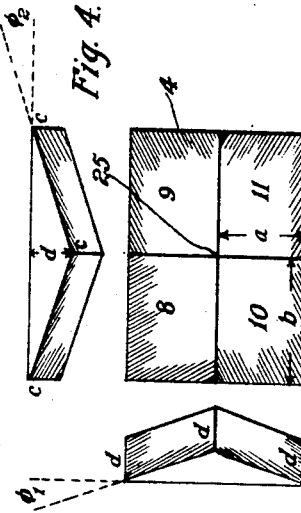
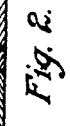
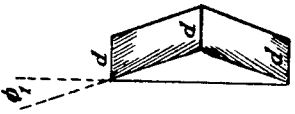
INVENTOR
Harold N. Cox
BY J A Procter
ATTORNEY Oct. 11, 1927.
H. N. COX
1,645,417
COLOR PHOTOGRAPHY
Original Filed May 24, 1921   2 Sheets-Sheet 2
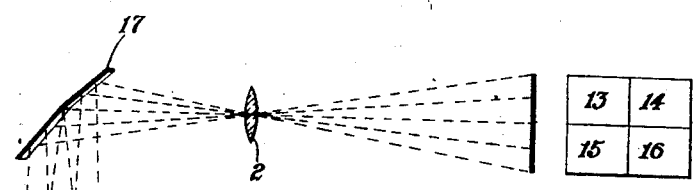
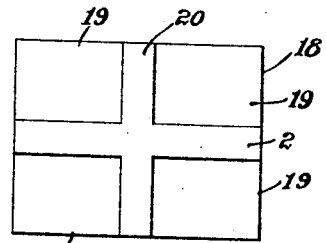
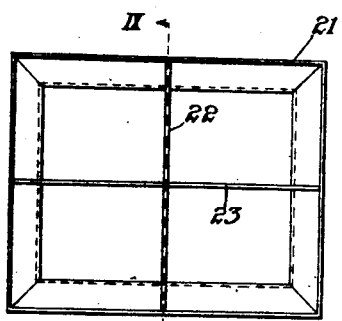
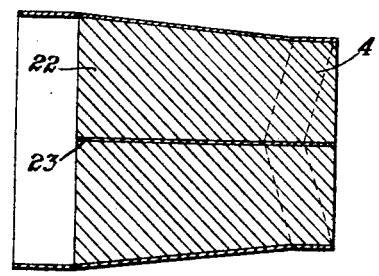
INVENTOR
Harold N. Cox
BY J H Procter
ATTORNEY Patented Oct. 11, 1927.

1,645,417

UNITED STATES PATENT OFFICE.

HAROLD N. COX, OF GLEN RIDGE, NEW JERSEY, ASSIGNOR TO COX MULTI-COLOR PHOTO COMPANY, A CORPORATION OF DELAWARE.

COLOR PHOTOGRAPHY.

Application filed May 24, 1921, Serial No. 472,145. Renewed November 13, 1925.

My invention relates to photographic devices and particularly to multiple-image color photography.

One object of my invention is to provide a system of photography whereby a plurality of images severally having the fundamental colors may be obtained from a single objective, which images if recombined will produce a single image having the true colors.

Another object of my invention is to provide a photographic device of the above indicated character that shall permit of good illumination and color-rendering properties and preclude overlapping of the images.

Another object of my invention is to provide a multiple-image photographic device that shall not require adjustment when the object is located at different distances from the device.

Another object of my invention is to provide a multiple-image photographic device that shall utilize films of standard width and that may be readily attached to standard photographic and reproduction equipment.

A further object of my invention is to provide an optical device, of the above indicated character, that shall be simple and inexpensive to construct and effective in its operation.

Heretofore, it has been proposed to interpose a prism between the objective and the focal plane of a camera for the purpose of forming a plurality of monochrome images on the sensitized plate. If plates or screens of different colors are used between the prisms and the focal plane, the various monochrome images are of different colors.

In my invention, I provide a photographic system, of the above indicated character, in which I form four images on the focal plane that are symmetrical and of equal size, and I further provide means whereby the images thus formed do not overlap and are well illuminated, and, thus, may be readily used to produce a composite picture in colors when projected through a similar prism onto a screen. The system is so arranged that it need not be adjusted when the object is disposed at different distances from the lens.

Fig. 1 of the accompanying drawings is a side view, partially in elevation and partially in sections, of a camera embodying my invention.

Fig. 2 is a front elevational view of the prism used in my invention.

Fig. 3 is a side elevational view of the prism shown in Fig. 2.

Fig. 4 is a top plan view of the prism shown in Fig. 2.

Fig. 5 is a perspective view of the prism shown in Figs. 2, 3 and 4.

Fig. 6 is a diagrammatic view of an optical system embodying a modified form of my invention.

Fig. 7 is a plan view of a screen used in my invention.

Fig. 8 is a front elevational view of a partition arrangement, or hood, embodying my invention, and Fig. 9 is a side view, partially in elevation and partially in section, of the device shown in Fig. 8.

A camera 1, embodying my invention, comprises, in general, an objective or lens 2 in a holder 3 in which a prism 4 is also disposed, a ground glass plate 5, a sensitized member 6 in the focal plane and a bellows 7.

The prism 4 has a flat base and four plane faces 8, 9, 10 and 11, the inner edges of which meet in the axis 25 of the objective or lens 2. The plane faces 8, 9, 10 and 11 are so arranged and are of such angularity that a single object designated as 12 is transmitted as four images 13, 14, 15 and 16 of equal size and symmetrically placed with respect to the axis 25.

In order to obtain the above result, the dimensions $c$ of the prism, are equal to the width $a$ of one face, times the tangent of the angle $\phi$, and the dimensions $d$ are equal to the length $b$ of one face, times the tangent of the angle $\phi_2$.

The prism 4 is so positioned at the front principal focus of the lens 2 that light entering the lens 2 must pass therethrough and, consequently, four images are formed on the focal plane. If a sensitized plate or film 6 is disposed adjacent the focal plane, four similar pictures 13, 14, 15 and 16 of the object 12 are produced from a single exposure. When the prism is disposed as indicated, its position need not be altered when the position of the object is changed, A color filter or screen 24 is provided for the inclined faces 8, 9, 10 and 11 of the prism, and the colors adjacent the respective faces are so selected that their dominant hues are as closely as possible equidistant on the color circle, and their transmission of light is so balanced that, in photographing a white or grey object, the effects upon the sensitive emulsion are equal.

If the four images on the negative are used to produce a positive lantern slide or film, and light is transmitted therethrough, and also through a similar prism and lens, and the proper color filters used, a single colored image may be projected on a screen (not shown). The color filters used for projection work have dominant hues which are substantially the same as the other screens or filters, but the transmission of light therethrough is so balanced that their additive combination will produce a white image. The colored picture so produced will show the natural colors of the objects photographed originally.

It will be readily seen from the above that this system is particularly adaptable for motion-picture photography, as no change in speed or other adjustments are necessary. The only thing necessary is to supply a prism, with the proper color screens, to the motion picture operator.

The color screens or filters 24 may be placed in any suitable position with respect to other members of the optical system.

Changes in the size and refracting power of the prism may change the place where the prism should be located. To preclude any change in the position of the prism with respect to the lens for different distances between object and image, the mean refracting plane of the prism should be fixed at the front principal focus of the image-forming lens 2, and the angle of deviation caused by the prismatic lens for rays parallel to the principal axis, should be substantially equal to one quarter of the angle of view of the image-forming lens when the center of the plate is at the back principal focus.

The filters or screen which are used to take the picture may be used for viewing, if a compensating filter or screen is used which will substantially equalize the effect of the colors upon the sensitized film or plate. If the difference in the effect is not too great, the compensation may be effected in printing the positive, by giving the images different degrees of exposure. The latter can be easily accomplished by using, as a printing screen, a positive transparency made as the result of photographing, by means of the optical system including the color filters or screens, a white uniformly illuminated plane surface.

The prismatic lens may be made in one piece or in separate pieces and suitably joined, and may be of any transparent material and of any shape that will give the desired refraction. A simple prismatic lens does not cause the colors to focus in exactly the same plane but produces a soft image of satisfactory definition. Greater definition may be secured by changing the angle $\phi$ shown in Figs. 2, 3, 4 and 5, of each inclined face 8, 9, 10 and 11 for the color transmitted, or the prism may be made achromatic.

The mirrors 17, as shown in Fig. 6, may be used in place of the prism if desired. This arrangement is clearly shown and, except for the statement that the mirrors are arranged to produce four equal images of a single object, this modification need not be further described.

When a single prism is used, as shown in Figs. 1, 2, 3, 4 and 5, it may be, and preferably is, desirable to use a screen 18 as shown in Fig. 7, which consists of transparent portions 19 and opaque portions 20. This prevents overlapping of the images if it is placed perpendicular to the axis of the objective 2, either in front of or behind the prism 4.

In order to obtain better illumination, an opaque hood 21, as shown in Figs. 1, 8 and 9, with partitions 22 and 23, is employed. This hood is disposed in front of the prism 2, and its length is so adjusted as to just prevent overlapping of the images. If a divergent prism is used behind the objective, the partitions may be extended from the prism to near the sensitized plate 6. With the above arrangement it will be seen that the rays forming the various images are separate and distinct and, consequently, no overlapping can obtain.

My invention is not limited to the particular specific devices illustrated, as various modifications may be made therein without departing from the spirit and scope of the invention, as set forth in the appended claims. I desire it to be understood therefore, that the appended claims are to be construed to cover such variations of angles and relative dimensions and such duplication of parts as may be desired, provided the result which is contemplated by my invention is secured.

I claim as my invention:

1. A system of photography comprising a single objective, and a refracting prism having four faces all on one side thereof and so joined as to form four equally spaced focal images.

2. A system of photography comprising a single objective and a prism completely covering the light transmitting opening of the objective and having a plurality of faces intersecting at such angles on one side thereof that four images are formed on a sensitized medium which is disposed in the focal plane of the system.

3. A system of photography comprising a single objective, and a prism completely covering the light transmitting opening of the objective and having a plurality of faces on one side thereof intersecting at such angles that four symmetrically disposed images are formed on a sensitized medium which is disposed in the focal plane.

4. A system of photography comprising an objective, and a prism having four plane faces on one side thereof said faces intersecting on the axis of the objective and forming such angles with respect to each other that four images are produced.

5. The combination with an objective, of a prism having four faces on one side thereof intersecting on the axis of the objective, and means cooperating with the respective faces of the prism whereby four monochrome images of different colors may be produced.

6. The combination with a single objective, of a prism having four faces on one side thereof intersecting on the axis of the objective, and means disposed adjacent the prism for precluding overlapping of the four images thereon.

7. The combination with a single objective, of a prism having a plurality of faces on one side thereof intersecting on the axis of the objective and covering the entire light space of the objective to produce four equal size images.

8. The combination with a single objective, of a prism having a flat base surface and four inclined surfaces on the opposite side thereof, the innter terminal edges of which meet at a point which coincides with the axis of the objective.

9. The combination with a single objective, of a prismatic lens having four faces on one side thereof, and means for conforming the rays of light through each face of the prismatic lens to its respective portion of a sensitized member.

10. The combination with a single objective, of a prism having a flat rectangular base surface and eight other surfaces, four of which constitute the sides of a solid body, the vertex of which lies within the axis of the objective.

11. A system of photography comprising an objective, a prism having a plane base and four inclined faces on one side thereof forming a body, portions of which have been truncated, said faces intersecting in the axis of the objective and forming such angles that four images are produced.

12. The combination with an image forming lens, of a prismatic lens having four faces on one side thereof, intersecting on the axis of the image forming lens and being disposed at the front principal focus of the image forming lens.

13. A system of photography comprising an objective, a refractory prism having four faces all on one side thereof, so joined as to form four equally spaced focal images, said prism being disposed at the front principal focus of the objective.

14. The combination with an objective, of a prism having a plurality of faces intersecting on the axis of the objective and covering the entire light space of the objective to produce a plurality of equal-size images, said prism being disposed at the front principal focus of the objective.

15. The combination with an objective, of a prism having a plurality of faces intersecting on the axis of the objective to produce a plurality of equal-size images, said prism being disposed at the front principal focus of the objective.

16. The combination with an image forming lens, of a prismatic lens having a plurality of similar faces disposed at the front principal focus of the image forming lens.

17. The combination with an image forming lens, of a prismatic lens having a plurality of similar symmetrically arranged faces disposed at the front principal focus of the image forming lens.

In testimony whereof, I have hereunto subscribed my name this nineteenth day of May, 1921.

HAROLD N. COX.